(12) United States Patent
Lin

(10) Patent No.: US 10,140,024 B2
(45) Date of Patent: Nov. 27, 2018

(54) DATA STORAGE DEVICE AND DATA READING METHOD THEREOF

(71) Applicant: Silicon Motion, Inc., Jhubei (TW)

(72) Inventor: Yu-Chih Lin, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 149 days.

(21) Appl. No.: 15/265,563

(22) Filed: Sep. 14, 2016

(65) Prior Publication Data

US 2017/0083234 A1 Mar. 23, 2017

Related U.S. Application Data

(60) Provisional application No. 62/220,008, filed on Sep. 17, 2015.

(30) Foreign Application Priority Data

Jun. 27, 2016 (TW) .............................. 105120136 A

(51) Int. Cl.
*G06F 3/06* (2006.01)
*G06F 13/16* (2006.01)

(52) U.S. Cl.
CPC ............ *G06F 3/061* (2013.01); *G06F 3/0659* (2013.01); *G06F 3/0679* (2013.01); *G06F 13/1673* (2013.01)

(58) Field of Classification Search
CPC .. G06F 3/0659; G06F 3/0679; G06F 12/0246; G06F 3/061; G06F 3/0688; G06F 11/1068; G06F 3/0656; G06F 3/0613; G06F 3/064; G06F 12/00; G06F 2212/214

See application file for complete search history.

(56) References Cited

U.S. PATENT DOCUMENTS

| | | | | |
|---|---|---|---|---|
| 2014/0304475 A1* | 10/2014 | Ramanujan | ......... | G06F 12/0895 711/128 |
| 2015/0347314 A1* | 12/2015 | Lee | ...................... | G06F 12/1009 711/103 |
| 2016/0070507 A1* | 3/2016 | Hoshikawa | ......... | G06F 12/0246 711/149 |
| 2017/0075824 A1* | 3/2017 | Haen | ................... | G06F 13/4243 |

* cited by examiner

*Primary Examiner* — Reginald G Bragdon
*Assistant Examiner* — Thanh D Vo
(74) *Attorney, Agent, or Firm* — Wang Law Firm, Inc.

(57) ABSTRACT

The present invention provides a data storage device including a flash memory, a random access memory, and a controller. The controller selects a first read command where the required mapping table has already been loaded on the random access memory from a plurality of read commands. Before a first read task prepared by the first read command is executed, the controller selects a second read command from the remaining read commands, selectively reads a first data sector of the first read command and the mapping table of the second read command at the same time, or reads the first data sector and a second data sector of the second read command at the same time.

25 Claims, 15 Drawing Sheets

DATA STORAGE DEVICE AND DATA READING METHOD THEREOF

CROSS REFERENCE TO RELATED APPLICATIONS

This application claims priority of Taiwan Patent Application No. 105120136, filed on Jun. 27, 2016, the entirety of which is incorporated by reference herein. Moreover, this application claims the benefit of U.S. Provisional Application No. 62/220,008 filed Sep. 17, 2015, the entirety of which is incorporated by reference herein.

BACKGROUND OF THE INVENTION

Field of the Invention

The present invention relates to a data reading method of a data storage device, and in particular to a data reading method capable of determining the order of read tasks.

Description of the Related Art

Flash memory is considered a non-volatile data storage device, using electrical methods to erase and program itself. Taking NAND Flash as an example, it is often used in memory cards, USB flash devices, solid state devices, eMMC, and for other uses.

Flash memory such as NAND Flash uses a multiple-block structure to store data. Each block contains multiple pages, wherein the write unit of the flash memory is the page, and the erase unit of the flash memory is the block. In the conventional eMMC specifications, each read command must be performed after the previous read command is finished. Namely, the data storage device receives the next read command from the host only once the current read command is finished. Therefore, it is important to increase the efficiency of processing read commands for the data storage device.

BRIEF SUMMARY OF THE INVENTION

A detailed description is given in the following embodiments with reference to the accompanying drawings.

An exemplary embodiment provides a data storage device. The data storage device includes a flash memory, a random access memory, and a controller. The controller receives a plurality of read commands from a host, wherein a data sector indicated by one of the read commands requires one of a plurality of mapping tables to be located, each of the read commands is arranged to prepare a read task, the read task is arranged to transmit the data sector indicated by the corresponding read command to the host, wherein the controller selects a first read command where the required mapping table has already been loaded on the random access memory from the read commands, and a first read task prepared by the first read command is the first of the read tasks to be executed. Before the first read task is executed, the controller selects a second read command from the remaining read commands and arranges a second read task prepared by the second read command to be executed after the first read task. Before the first read task is executed, the controller further selectively reads a first data sector indicated by the first read command and the mapping table that a second task prepared by the second read command needs at the same time from the flash memory, or it reads the first data sector indicated by the first read command and a second data sector indicated by the second read command at the same time from the flash memory.

Another exemplary embodiment provides a data storage device. The data storage device includes a flash memory, a random access memory, and a controller. The controller receives a plurality of read commands from a host to constitute a command queue, and determines an order for the execution of the read commands, wherein a data sector indicated by one of the read commands requires one of a plurality of mapping tables to be located, and each of the read commands is arranged to prepare a read task that is arranged to transmit the indicated data sector to the host. The controller selects a first read command where the required mapping table has already been loaded on the random access memory from the read commands to be the first of the read tasks to be executed, wherein in the remaining read commands, the read command where the required mapping table is not loaded on the random access memory has a higher priority than the read command where the required mapping table has already been loaded on the random access memory.

Another exemplary embodiment further provides a data reading method applied to a data storage device having a flash memory. The data reading method includes receiving a plurality of read commands from a host, wherein a data sector indicated by one of the read commands requires one of a plurality of mapping tables to be located, each of the read commands is arranged to prepare a read task, the read task is arranged to transmit the data sector indicated by the corresponding read command to the host; determining whether the mapping tables required by the read commands are loaded on a random access memory; selecting a first read command where the required mapping table has already been loaded on the random access memory from the read commands. The first read task prepared by the first read command is the first of the read tasks to be executed. Before the first read task is executed, selecting a second read command from the remaining read commands and arranging a second read task prepared by the second read command to be executed after the first read task; and before the first read task is executed, selectively reading a first data sector indicated by the first read command and the mapping table that a second task prepared by the second read command needs at the same time from the flash memory, or reading the first data sector indicated by the first read command and a second data sector indicated by the second read command at the same time from the flash memory.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
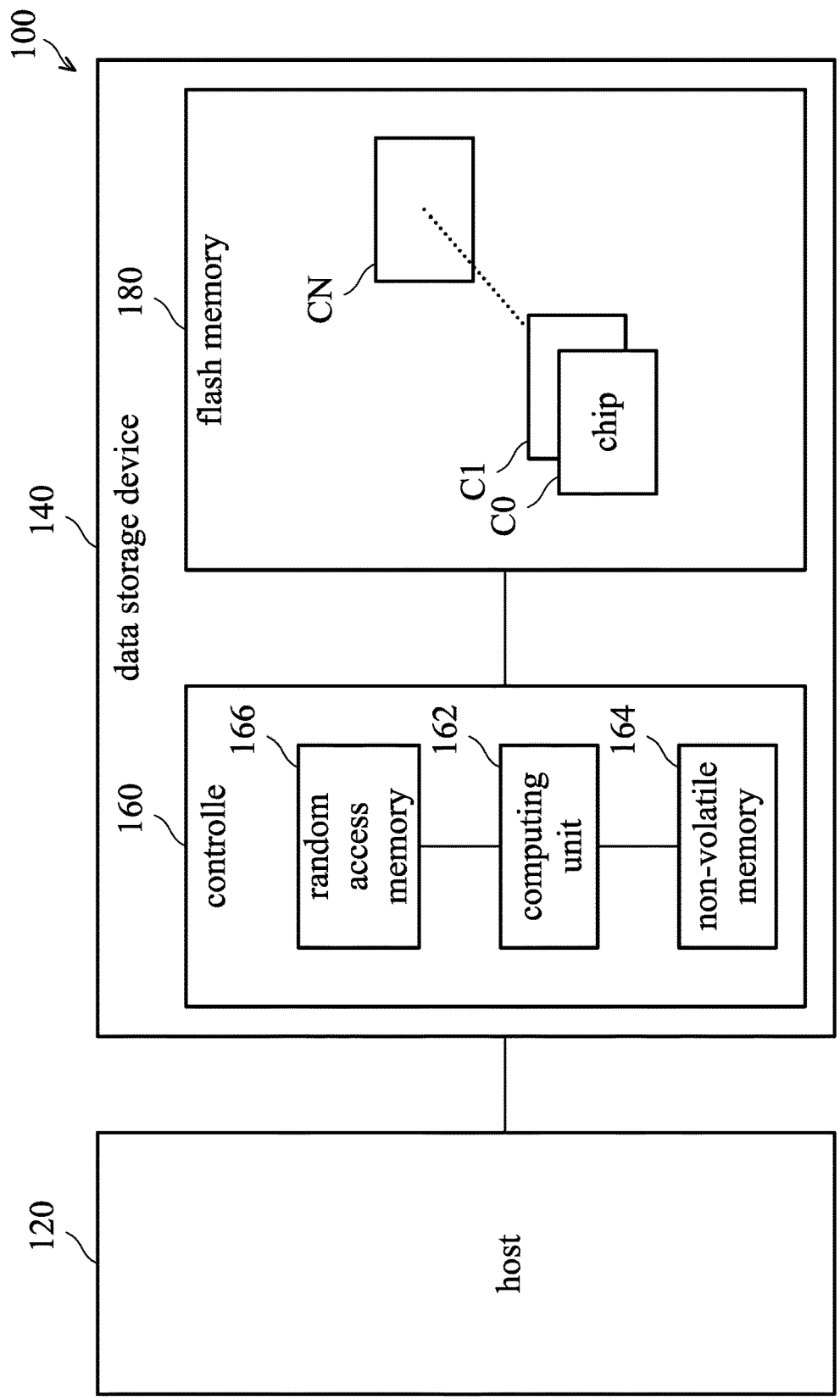
FIG. 1 is a schematic diagram illustrating an electronic system in accordance with some embodiments.

FIG. 1 is a schematic diagram illustrating an electronic system in accordance with some embodiments. The electronic system 100 includes a host 120 and a data storage device 140. The data storage device 140 includes a flash memory 180 and a controller 160, and operates in response to the commands of the host 120. It should be noted that, in one embodiment, the data storage device 140 should meet Embedded Multi Media Card (eMMC) specifications.

The controller 160 includes a computing unit 162, a non-volatile memory 164 (ROM), and a random access memory 166 (RAM). The non-volatile memory 164, the program code stored in the non-volatile memory 164 and data stored in the non-volatile memory 164 constitute firmware executed by the processing unit 162, and the controller 160 is configured to control the flash memory 180 based on the firmware. The random access memory (RAM) 166 is arranged to temporarily store and cache the data required by the controller 160. Namely, the data and parameters required by the controller 160 can be loaded on the random access memory 166 to shorten the busy period of the controller 160. It should be noted that, in some embodiments, the random access memory 166 keeps the mapping tables that had been used by the previous commands until the memory space for caching the data of the read commands in the random access memory 166 is filled, wherein the random access memory 166 starts to clean the mapping tables that had been used by the previous commands in order to make room for the other mapping tables once the memory space for caching the data of the read commands in the random access memory 166 is filled.

The flash memory 180 includes a plurality of chips C0~CN, and each of chips C0~CN includes a plurality of pages. The pages of chips C0-CN can be assembled into a plurality of blocks according to a predetermined order. In one embodiment, the flash memory 180 has a plurality of mapping tables arranged to record the mapping relationships of the data stored in the flash memory 180, wherein when the controller 160 requires a mapping table to perform a read command, the mapping table is arranged to be loaded on the random access memory 166 for the controller 160. Moreover, the flash memory 180 further includes a plurality of channel select lines (CH) and a plurality of chip select lines (CE). Chips C0~CN can be arranged in a matrix, the channel select line is arranged to select the rows of the matrix, and the chip select line is arranged to select the columns of the matrix (grid). Namely, chips C0~CN are enabled by the channel select lines and the chip select lines in the matrix.

Figure 2:
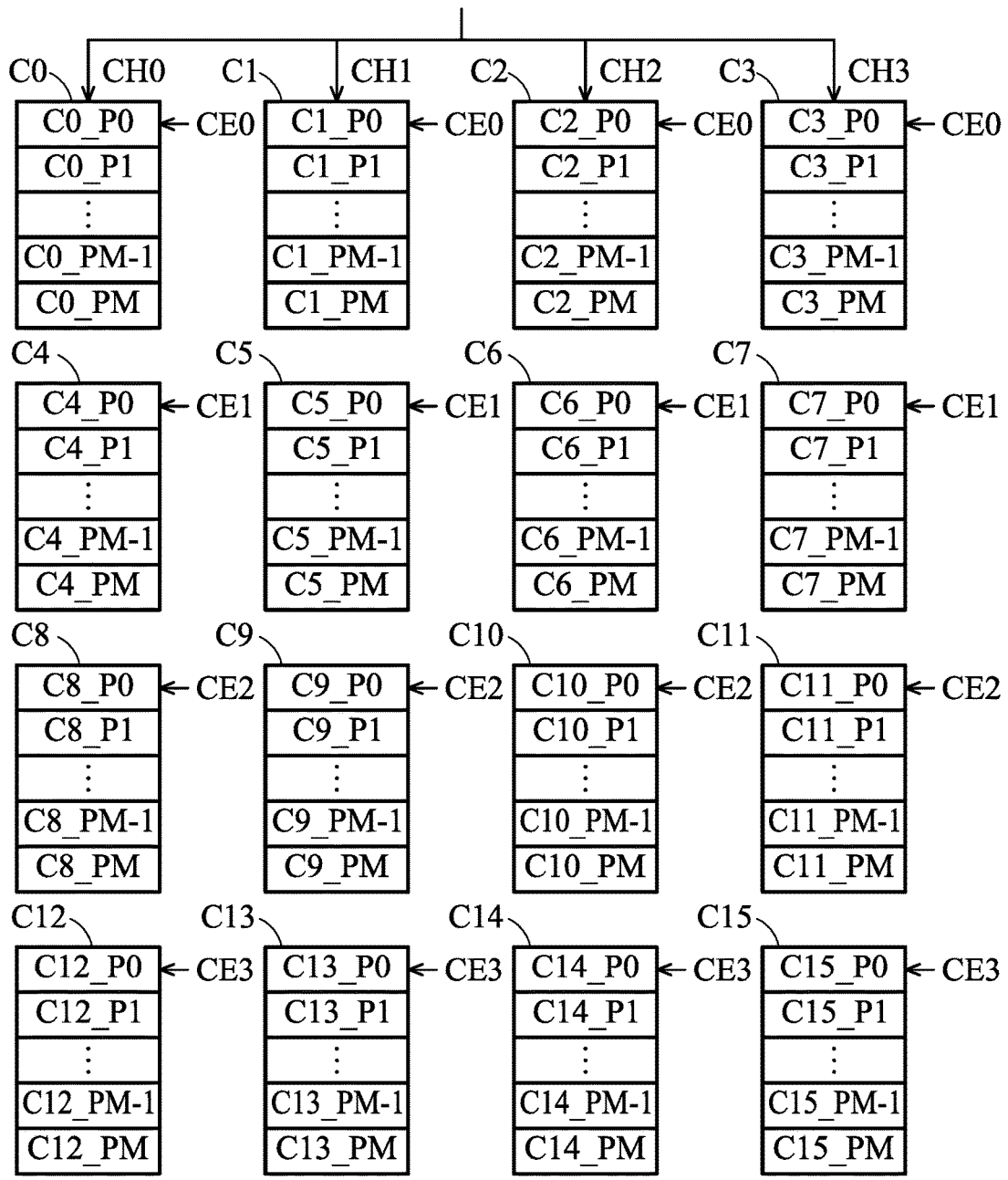
FIG. 2 is a schematic diagram illustrating a flash memory in accordance with some embodiments.

For example, FIG. 2 is a schematic diagram illustrating a flash memory in accordance with some embodiments. In this embodiment, the flash memory 180 includes sixteen chips C0~C15. Each of chips C0~C15 includes a plurality of pages, wherein chip C0 includes a plurality of pages C0_P0~C0_PM, chip C1 includes a plurality of pages C1_P0~C1_PM, chip C2 includes a plurality of pages C2_P0~C2_PM, and so on. The flash memory 180 further includes four channel select lines CH0~CH3 and four chip select lines CE0~CE3. As shown in FIG. 2, chips C0~C15 construct a matrix, the channel select lines CH0~CH3 are arranged to select the row of the matrix, the chip select lines CE0~CE3 are arranged to select the column of the matrix. More specifically, channel select line CH0 is arranged to select chips C0, C4, C8 and C12 on the first row of the matrix, channel select line CH1 is arranged to select chips C1, C5, C9 and C13 on the second row of the matrix, channel select line CH2 is arranged to select chips C2, C6, C10 and C14 on the third row of the matrix, and channel select line CH3 is arranged to select chips C3, C7, C11 and C15 on the fourth row of the matrix. Moreover, chip select line CE0 is arranged to select chips C0~C3 on the first column of the matrix, chip select line CE1 is arranged to select chips C4~C7 on the second column of the matrix, chip select line CE2 is arranged to select chips C8~C11 on the third column of the matrix, and chip select line CE3 is arranged to select chips C12~C15 on the fourth column of the matrix. Namely, when the controller 160 needs to access chip C10, the flash memory 180 selects chip C10 by channel select line CH2 and chip select line CE2, and so on. In another embodiment, the flash memory 180 may include thirty-two chips, four channel select lines and eight chip select lines, but it is not limited thereto. It should be noted that, in this embodiment, the data sectors stored in the pages controlled by different chip select lines can be read from the chips of the flash memory 180 at the same time. For example, the controller 160 can read the data stored in page C0_P1, page C5_P1, page C9_P3 and page C15_PM from the flash memory 180 at the same time, but it is not limited thereto.

In the specification of the new 5.1 version of eMMC, the host 120 can only transmit a read command to the data storage device 140 at one time, and the next read command is allowed to be transmitted only after the data indicated by the current read command is transmitted to the host 120. Namely, the host 120 can only transmit the next read command to the data storage device 140 after the previous read command is finished. However, there is an exception "eMMC Command Queue" in the specification of the new 5.1 version of eMMC, the "eMMC Command Queue" allows the host 120 to continuously transmit commands to the data storage device 140, so that the data storage device 140 can store the received read commands to construct a command queue (Command Queue), and determine the execution sequence of the commands in the command queue. After the execution sequence is determined, the data storage device 140 will inform the host 120 which read task of the read command is ready to be executed, and transmit the read task to the host 120 after the host 120 has confirmed. Namely, the controller 160 determines the execution order of the read task prepared (readied) by the read commands after the read commands are continuously received from the host 120, wherein the term "continuously" means that the read commands are not received at once, each of the read commands are individually ordered by the host 120 at different times (tasks).

Figure 3:
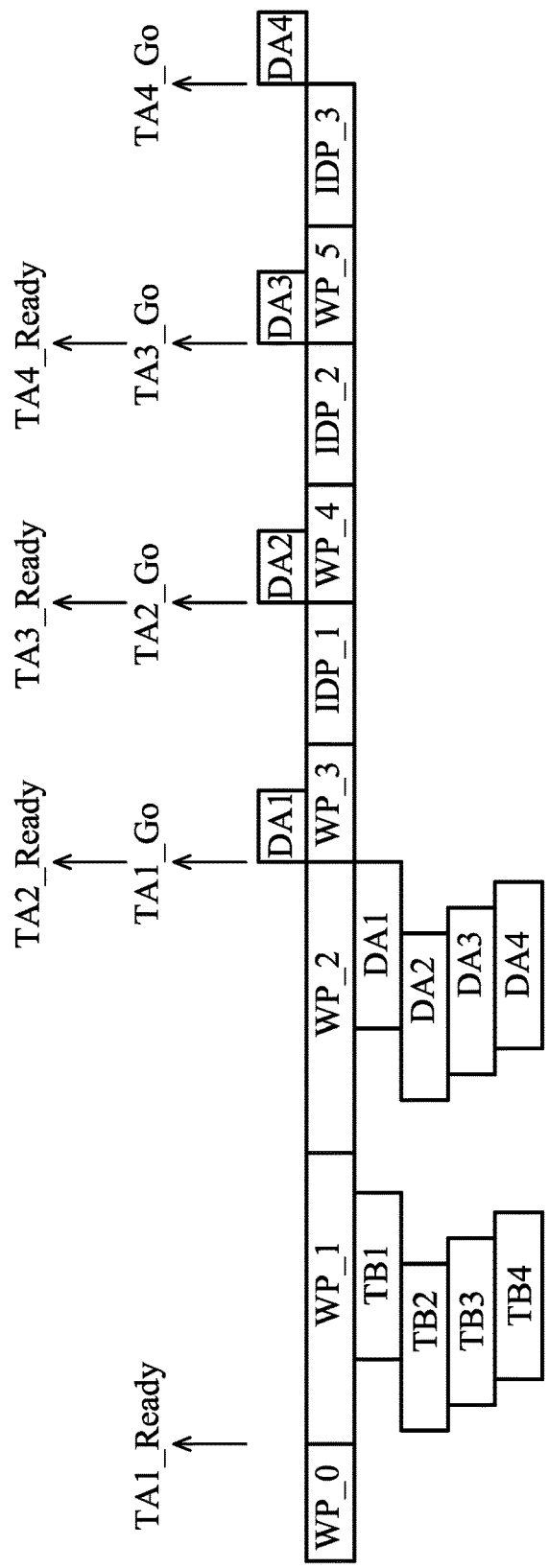
FIG. 3 is a schematic diagram illustrating the data and command flow under the eMMC specification in accordance with an embodiment.

FIG. 3 is a schematic diagram illustrating the data and command flow under the eMMC specification in accordance with an embodiment. In this embodiment, the work periods WP_0~WP_5 represent the time that the controller 160 is working. Namely, in the work periods WP_0~WP_5, the controller 160 is processing data and parameters. For example, in the work period, the controller 160 can analyze the read command to obtain a logic address of the read command, obtain the mapping table according to the logic address, read the mapping table from the flash memory 180, obtain the physical address of the data indicated by the read command according to the mapping table, read the data indicated by the read command from the flash memory 180, and select the next read task according to a specific algorithm, etc., but it is not limited thereto. In this embodiment, the data storage device 140 receives four read commands from the host 120, wherein one of the read commands requires one of the mapping tables to locate the data indicated by the read command, each of the read commands is arranged to prepare (ready) a read task, and the read task is arranged to transmit the data indicated by the read command to the host 120, but it is not limited thereto. The number 4 of the read commands is only an instance to explain the embodiment. In other embodiments, the data storage device 140 may receive any number of read commands from the host 120 to construct a command queue.

In this embodiment, after receiving a plurality of read commands from the host 120 and obtaining a command queue, the controller 160 reads the read commands received during work period WP_0 to obtain the execution sequence of a plurality of read tasks corresponding to the read commands and the parameters of the read commands, such as the logic address of the data indicated by the read command. Next, the controller 160 pulls a first task ready signal TA1_Ready to inform the host 120 that the first read task is ready to go. Next, the controller 160 reads all of the mapping tables TB1~TB4 required by the read commands from the flash memory 180 during work period WP_1, and reads the data sectors DA1~DA4 indicated by all of the read commands from the flash memory 180 according to the mapping tables TB1~TB4 obtained during work period WP_2. It should be noted that the mapping tables TB1~TB4 overlap in FIG. 3 to represent that the mapping tables TB1~TB4 are read at the same time, and the data sectors DA1~DA4 also overlap in FIG. 3 to represent that the data sectors DA1~DA4 are read at the same time. Namely, in this embodiment, the mapping tables TB1~TB4 are controlled by different chip select lines, so that the mapping tables TB1~TB4 can be read from the flash memory 180 at the same time. Similarly, the data sectors DA1~DA4 are also controlled by different chip select lines, so that the data sectors DA1~DA4 can be read from the flash memory 180 at the same time. After the data sectors DA1~DA4 are read, the controller 160 determines whether the host 120 pulls a first task go signal TA1_Go. Generally, the work periods WP_1~WP_2 are longer than the return period of the task go signal from the host 120, so that, in this embodiment, the host 120 has already transmitted the first task go signal TA1_Go to the data storage device 140 by the time that the data sectors DA1~DA4 are read from the flash memory 180. Next, in response to the first task go signal TA1_Go, the controller 160 starts to transmit the first data sector DA1 indicated by the first read command to the host 120 to execute the first read task and pulls the second task ready signal TA2_Ready at the same time during work period WP_3. After the first data sector DA1 is transmitted to the host 120, the controller 160 starts to determine whether a second task go signal TA2_Go is received from the host 120. However, in practical operation, the work period WP_3 only takes 20~30 μs, and the time from the data storage device 140 pulling the second task ready signal TA2_Ready until the host 120 returning the second task go signal TA2_Go takes 70 μs. Therefore, there will be an idle period IDP_1 before the controller 160 receives the second task go signal TA2_Go. Next, after the second task go signal TA2_Go is received from the host 120, the controller 160 transmits the second data sector DA2 indicated by the second read command to the host 120 to execute the second read task and pulls the third task ready signal TA3_Ready during work period WP_4 in response to the second task go signal TA2_Go. Similarly, there will be another idle period IDP_2 before the controller 160 receives the third task go signal TA3_Go. Next, after the third task go signal TA3_Go is received, the controller 160 starts to transmit the third data sector DA3 indicated by the third read command to the host 120 to execute the third read task during work period WP_5 and pulls the fourth task ready signal TA4_Ready at the same time in response to the third task go signal TA3_Go. Similarly, there will be an idle period IDP_3 before the controller 160 receives the fourth task go signal TA4_Go. Finally, after the fourth task go signal TA2_Go is received from the host 120, the controller 160 transmits the fourth data sector DA4 indicated by the fourth read command to the host 120 to execute the fourth read task in response to the fourth task go signal TA2_Go. All of the read tasks of the command queue are done after the fourth read task is finished.

As described above, the idle periods IDP_1~IDP_3 are caused by waiting for the task go signal. In the idle periods IDP_1~IDP_3, the controller 160 cannot perform other tasks but must wait for the return of the host 120, and as a result, the idle periods IDP_1~IDP_3 reduce the effectiveness of the data storage device 140. It should be noted that, in this embodiment, the order of the read tasks can be determined during work period WP_0, but it is not limited thereto. In other embodiments, the first read task is determined during work period WP_0, the second read task is determined during work period WP_3, the third read task is determined during work period WP_4, and the fourth read task is determined during work period WP_5.

In view of this, the present invention provides another embodiment to increase the effectiveness of the data storage device 140. In this embodiment, the controller 160 receives a plurality of read commands from the host 120 to construct a command queue. Next, the controller 160 select the read command wherein the required mapping table has already been loaded on the random access memory 166 to serve as the first read command. The first read task prepared (read-ied) by the first read command is the first of the read tasks to be executed. Next, during the time from the first task ready signal is pulled until the second task go signal is pulling, the controller 160 determines the second read task and reads the first data sector of the first read task and the mapping table required by the second read task from the flash memory 180 at the same time to shorten the work period between the first task ready signal and the second task go signal, and uses the idle periods after the other work periods to load the mapping tables required by the other read commands. It should be noted that, in this embodiment, the controller 160 selects the read command where the required mapping table is not loaded on the random access memory

166 to be the next read command (the next read task), wherein the controller 160 is further arranged to select the read command where the required mapping table is controlled by a different chip select line than the current data sector indicated by the current read command to be the next read command (the next read task) from the read commands where the required mapping tables are not loaded on the random access memory 166. When the read commands where the required mapping tables are not loaded on the random access memory 166 are all done, the controller 160 is further arranged to select the read command where the required mapping table has been loaded onto the random access memory 166 to serve as the next read command (the next read task).

Namely, in the remaining read commands, the priority of the read command where the required mapping table is not loaded on the random access memory 166 is higher than the priority of the read command where the required mapping table has been loaded onto the random access memory 166. In the remaining read commands where the required mapping tables are not loaded on the random access memory 166, the priority of the read command where the required mapping table is controlled by a different chip select line than the current data sector indicated by the current read command is higher than that of the read command where the required mapping table is controlled by the same chip select line as the current data sector indicated by the current read command.

Moreover, the controller 160 is further arranged to dynamically adjust the memory space arranged to cache the data of the read commands in the random access memory 166 according to the number of read commands. More specifically, when the number of read commands is "N", the controller 160 is configured to adjust the memory space arranged to cache the data of the read commands in the random access memory 166 in order to cause each of the mapping tables required by the read commands to have 1/N chances of being loaded on the random access memory 166. Therefore, at least one of the mapping tables required by the read commands in the command queue will already be loaded on the random access memory 166. The details can found in FIGS. 4-8.

Figure 4:
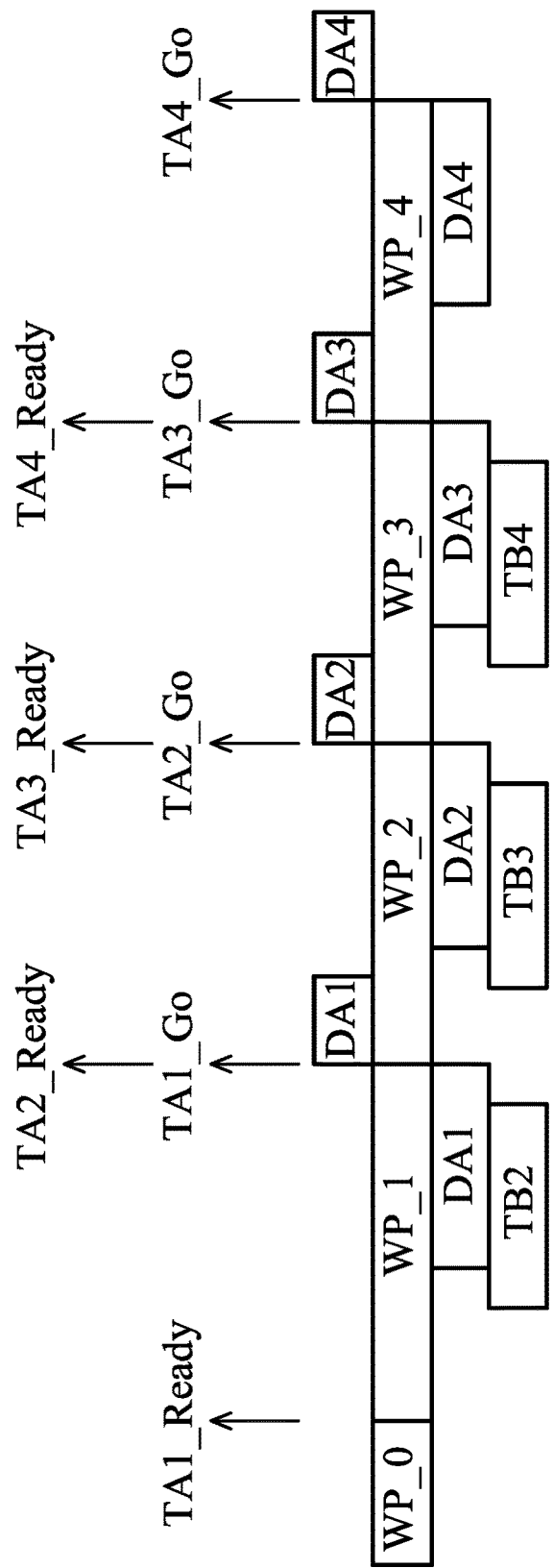
FIG. 4 is a schematic diagram illustrating the data and command flow under the eMMC specification in accordance with another embodiment.

FIG. 4 is a schematic diagram illustrating the data and command flow under the eMMC specification in accordance with another embodiment. In this embodiment, the command queue has four read commands, and one of the mapping tables required by one of the four read commands is already loaded on the random access memory 166, the mapping tables required by the other three read commands are not loaded on the random access memory 166. In this embodiment, the controller 160 receives four read commands from the host 120 to construct the command queue, but it is not limited thereto. The number (4) of read commands is only an example to illustrate the embodiment. In other embodiments, the number of read commands in the command queue can be a predetermined number, or can be dynamically determined by the controller 160 or the host 120. For example, the controller 160 can determine the number of read commands that have been received, and put all of the received read commands in the command queue.

More specifically, after the controller 160 receives four read commands from the host 120 to construct a command queue, the controller 160 determines whether the mapping tables required by the read commands are loaded on the random access memory 166 during work period WP_0, and selects a read command where the required mapping table has been loaded onto the random access memory 166 to serve as a first read command. Namely, the controller 160 selects the read task corresponding to the first read command to be the first of the read tasks to be executed.

After the first read command is selected, the controller 160 pulls a first task ready signal TA1_Ready and selects a second read command from the remaining read commands to arrange for the second read command to be executed after the first read command before the first read task is executed (the work period WP_1). It should be noted that, in this embodiment, the controller 160 reads the first data sector DA1 indicated by the first read command and the mapping table TB2 required by the second read command of the second read task from the flash memory 180 at the same time before the first read task is executed (the work period WP_1). In this embodiment, the controller 160 selects the read command where the required mapping table is not loaded on the random access memory 166 and controlled by a different chip select line than the first data sector to serve as the second read command. Therefore, the mapping table TB2 required by the second read command and the first data sector DA1 can be read at the same time to shorten the work period.

After the first data sector A1 and the mapping table TB2 are read from the flash memory 180, the controller determines whether the first task go signal TA1_Go is received from the host 120. Reading data from two different chips at the same time takes 70~80 μs, which is longer than the time from when the data storage device 140 pulls the first task ready signal TA1_Ready until the host 120 returns the first task go signal TA1_Go for 0~10 μs. Therefore, after the first data sector DA1 and the mapping table TB2 are read from the flash memory 180, the controller 160 does not need to spend time to wait for the first task go signal TA1_Go. Next, in response to the received first task go signal TA1_Go, the controller 160 pulls the second task ready signal TA2_Ready, transmits the first data sector DA1 to execute the first read task, determines the third read command, and simultaneously reads the second data sector DA2 indicated by the second read command and the mapping table TB3 required by the third read command from the flash memory 180 during work period WP_2.

After the second data sector DA2 and the mapping table TB3 are read from the flash memory 180, the controller determines whether a second task go signal TA2_Go is received from the host 120. Reading data from two different chips at the same time takes 70~80 μs, which is longer than the time from when the data storage device 140 pulls the second task ready signal TA2_Ready until the host 120 returns the second task go signal TA2_Go for 0~10 μs. Therefore, after the second data sector DA2 and the mapping table TB3 are read from the flash memory 180, the controller 160 does not need to spend time to wait for the second task go signal TA2_Go. Next, in response to the received second task go signal TA2_Go, the controller 160 pulls the third task ready signal TA3_Ready. Furthermore, in response to the received second task go signal TA2_Go, the controller further transmits the second data sector DA2 to the host to execute the second read task, determines the fourth read command, and simultaneously reads the third data sector DA3 indicated by the third read command and the mapping table TB4 required by the fourth read command from the flash memory 180 during work period WP_3.

After the third data sector DA3 and the mapping table TB4 are read from the flash memory 180, the controller determines whether a third task go signal TA3_Go is received from the host 120. Similarly, after the third data sector DA3 and the mapping table TB4 are read from the flash memory 180, the controller 160 will have already received the third task go signal TA3_Go from the host 120. Next, in response to the received third task go signal TA3_Go, the controller 160 pulls the fourth task ready signal TA4_Ready. Furthermore, in response to the received third task go signal TA3_Go, the controller further transmits the third data sector DA3 to execute the third read task, and reads the fourth data sector DA4 indicated by the fourth read command from the flash memory 180 during work period WP_4. It should be noted that, in this embodiment, the command queue only has four read commands, so that the fourth read command is the last command in the command queue. Therefore, the controller 160 does not need to determine the next read task and does not need to read the mapping table required by the next read command during work period WP_4.

Lastly, after the fourth data sector DA4 is read from the flash memory 180, the controller determines whether a fourth task go signal TA4_Go is received from the host 120. The time it takes to read data from a chip is about the same as the time it takes to read data from two different chips, so that the controller 160 does not need to wait and will already have received the fourth task go signal TA4_Go after the fourth data sector DA4 is read from the flash memory 180. Next, in response to the fourth task go signal TA4_Go, the controller 160 transmits the fourth data sector DA4 to the host 120 to execute the last fourth read task.

Figure 5:
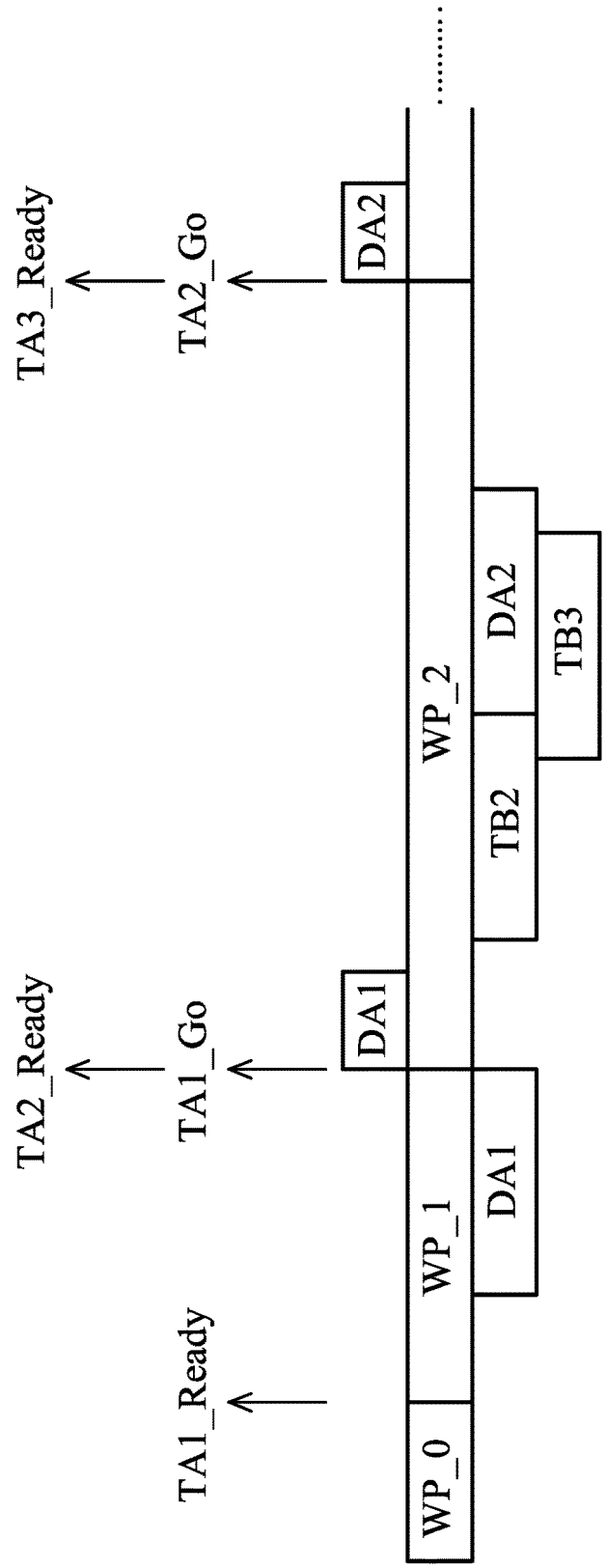
FIG. 5 is a schematic diagram illustrating the data and command flow under the eMMC specification in accordance with yet another embodiment.

In this embodiment, in the process of selecting the next read command, the controller 160 selects any of the read commands where the required mapping tables are not loaded on the random access memory 166 to serve as the next read command and only reads the current data sector indicated by the current read command from the flash memory 180 in the current work period when all of the mapping tables required by the remaining read command are not loaded on the random access memory 166 but are controlled by the same chip select line as the current data sector indicated by the current read command. Next, the controller 160 reads the mapping table required by the next read command from the flash memory 180 in the next work period. As shown in FIG. 5, during the process of determining the second read command, when all of the mapping tables required by the remaining read commands are not loaded on the random access memory 166 but are controlled by the same chip select line as the first data sector DA1, the controller 160 selects a read command where the required mapping table is not loaded on the random access memory 166 to serve as the second read command, and only reads the first data sector DA1 from the flash memory 180 during work period WP_1. Next, after the first task go signal TA1_Go arranged to execute the first read task from the host 120 and before a second task go signal TA2_Go arranged to execute the second read task is received from the host 120 (during work period WP_2), the controller 160 reads the mapping table TB2 required by the second read command from the flash memory 180 first, and simultaneously reads the second data sector DA2 indicated by the second read command and the mapping table TB3 required by the third read command from the flash memory 180. Similarly, when all of the mapping tables required by the remaining read commands are controlled by the same chip select line as the second data sector DA2, the mapping table TB3 is arranged to be read during work period WP_3, and so on.

Figure 6:
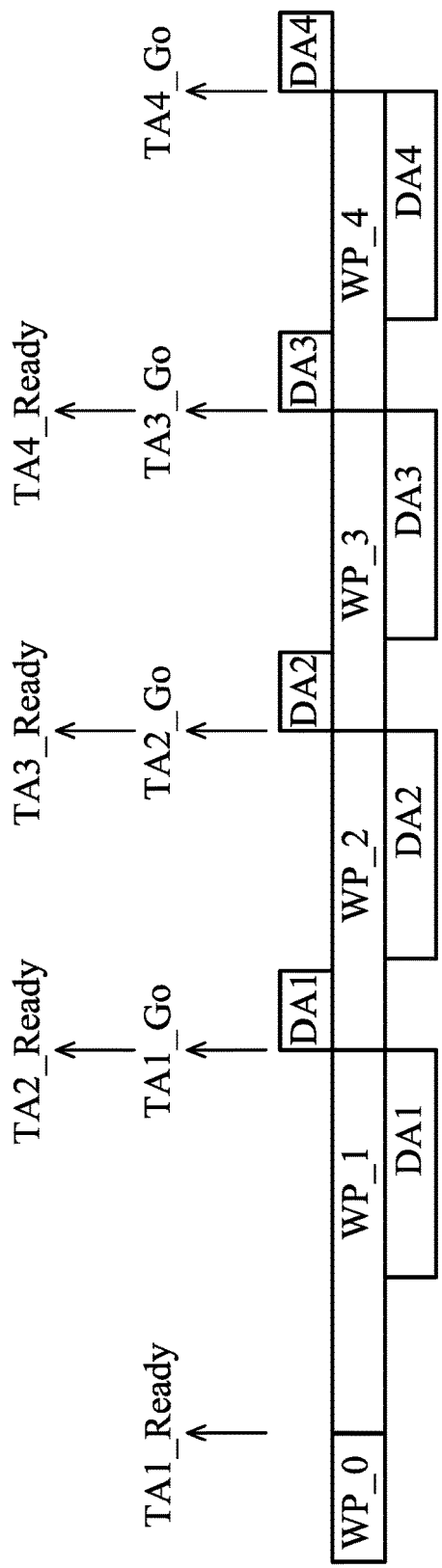
FIG. 6 is a schematic diagram illustrating the data and command flow under the eMMC specification in accordance with yet another embodiment.

During the process of selecting the next read command, when all of the mapping tables required by the remaining read commands are already loaded on the random access memory 166, the controller 160 selects any of the read commands to serve as the next read command, and only reads the current data sector from the flash memory 180 before the current read task is executed. As shown in FIG. 6, when all of the mapping tables required by the remaining read commands are loaded on the random access memory 166, the controller 160 selects any of the read commands to serve as the second read command, and only reads the first data sector DA1 from the flash memory 180 before the first read task is executed (work period WP_1). It should be noted that the read command where the required mapping table is not loaded on the random access memory 166 has a higher priority than the read command where the required mapping table has been loaded onto the random access memory 166. Therefore, if the mapping table required by the second read command is already loaded on the random access memory 166, it means the mapping tables required by the remaining read commands are all loaded on the random access memory 166, as shown in FIG. 6. As described above, the read commands that do not need to load the mapping tables are arranged in the tail of the command queue.

Figure 7:
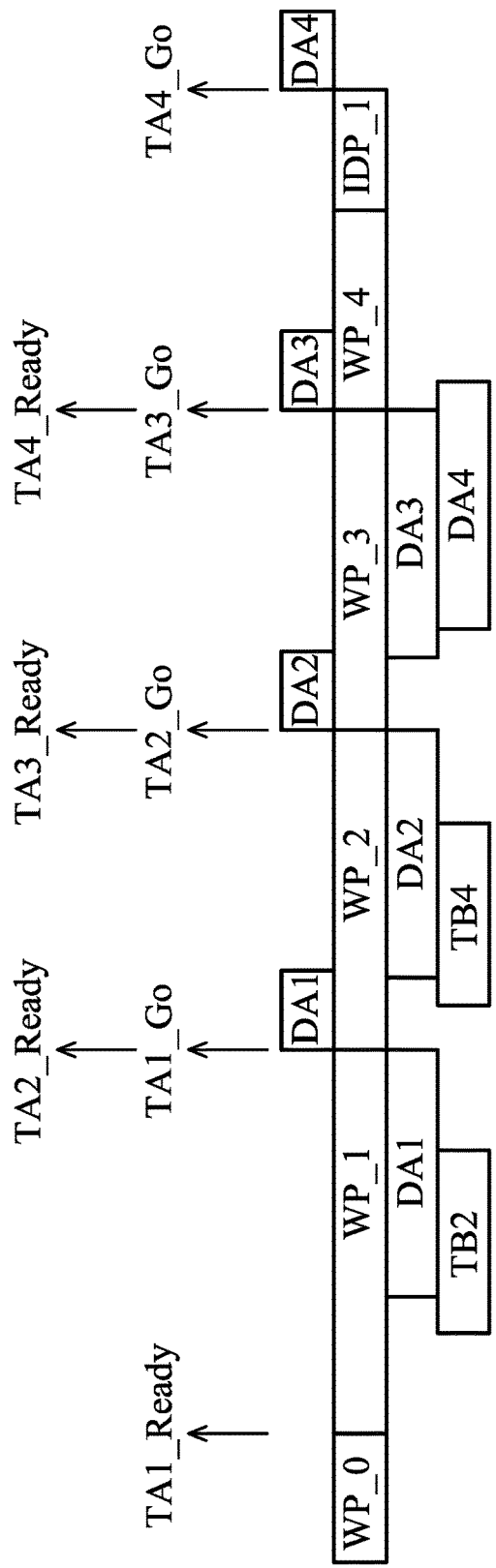
FIG. 7 is a schematic diagram illustrating the data and command flow under the eMMC specification in accordance with yet another embodiment.

In another embodiment, when all of the mapping tables required by the remaining read commands are loaded on the random access memory 166, the controller 160 selects the read command where the indicated data sector is controlled by a different chip select line than the current data sector to serve as the next read command, and reads the data sector indicated by the next read command in the current work period. Namely, when all of the mapping tables required by the remaining read commands are loaded on the random access memory 166, the controller 160 selects the read command where the indicated data sector is controlled by a different chip select line than the current data sector to serve as the next read command, and simultaneously reads the data sector indicated by the current read command and the data sector indicated by the next read command from the flash memory 180 before the current read task is executed (the current work period). For example, as shown in FIG. 7, all of the mapping tables required by the remaining read commands are loaded onto the random access memory 166 during the process of determining the fourth read command. Therefore, the controller 160 selects the read command where the indicated data sector is controlled by a different chip select line than the third data sector DA3 to serve as the fourth read command, and simultaneously reads the third data sector DA3 and the fourth data sector DA4 from the flash memory 180 before the third read task is executed (the work period WP_3). It should be noted that, as shown in FIG. 7, the controller 160 will need to wait for the last task go signal if the data sector indicated by the last read command is read in the previous work period. Namely, in this embodiment, there is an idle period IDP_1 of the controller 160 in the last. However, the duration of the idle period IDP_1 and the last work period WP4 will still be shorter than the time it takes for the work period WP4 to read the fourth data sector DA4.

Figure 8:
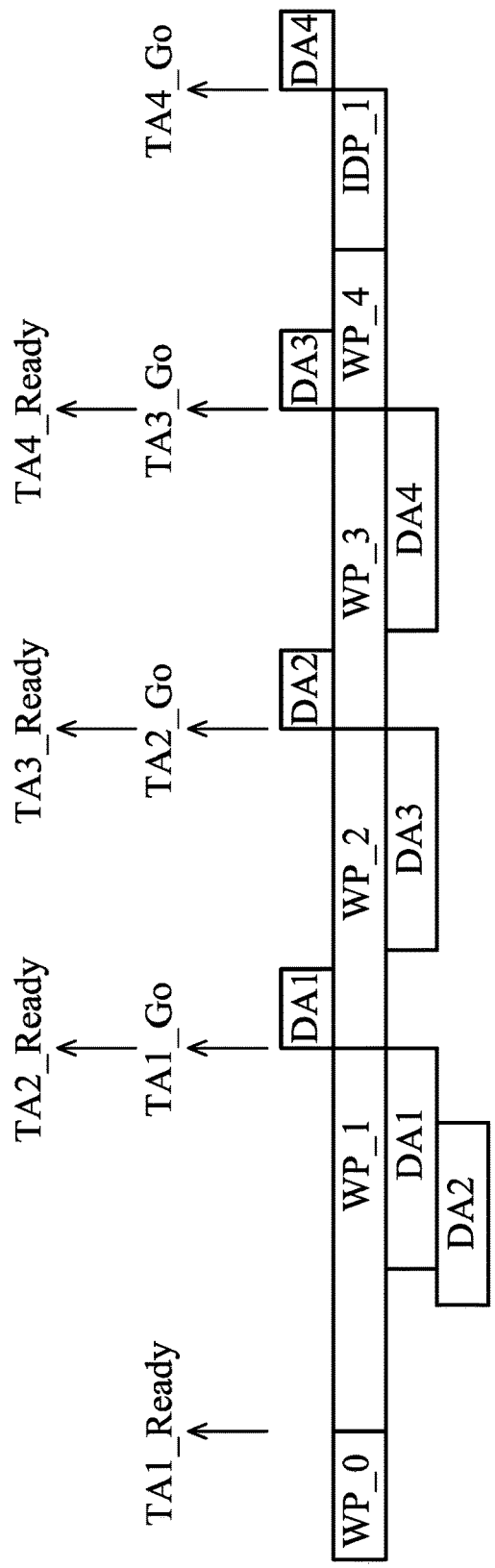
FIG. 8 is a schematic diagram illustrating the data and command flow under the eMMC specification in accordance with yet another embodiment.

In this embodiment, when all of the mapping tables required by the remaining read command are loaded on the random access memory 166 and the data sectors indicated by the remaining read commands are controlled by the same chip select line as the current data sector, the controller 160 selects any of the read commands to serve as the next read task and only reads the current data sector from the flash memory 180 before the current read task is executed. Moreover, when all of the mapping tables required by the remaining read command are loaded on the random access memory 166 and the current data sector indicated by the current read command is read in the previous work period, the controller 160 selects any of the read commands to serve as the next read command, and reads the data sector indicated by the next read command from the flash memory 180 before the current read task prepared by the current read command is executed. For example, as shown in FIG. 8, all of the mapping tables required by the read commands are loaded on the random access memory 166. The second data sector DA2 is controlled by the chip select line which is different from the chip select line controlling the first data sector DA1, so that the second data sector DA2 is read during work period WP_1. Therefore, during work period WP_2, the controller 160 selects any of the read commands to serve as the third read command, and only reads the third data sector DA3 indicated by the third read command from the flash memory 180, and so on. The third data sector DA3 has been read during work period WP_2, so that the controller 160 selects any of the remaining read commands to serve as the fourth read command and only reads the fourth data sector DA4 indicated by the fourth read command from the flash memory 180 during work period WP_3, and so on.

Figure 9A:
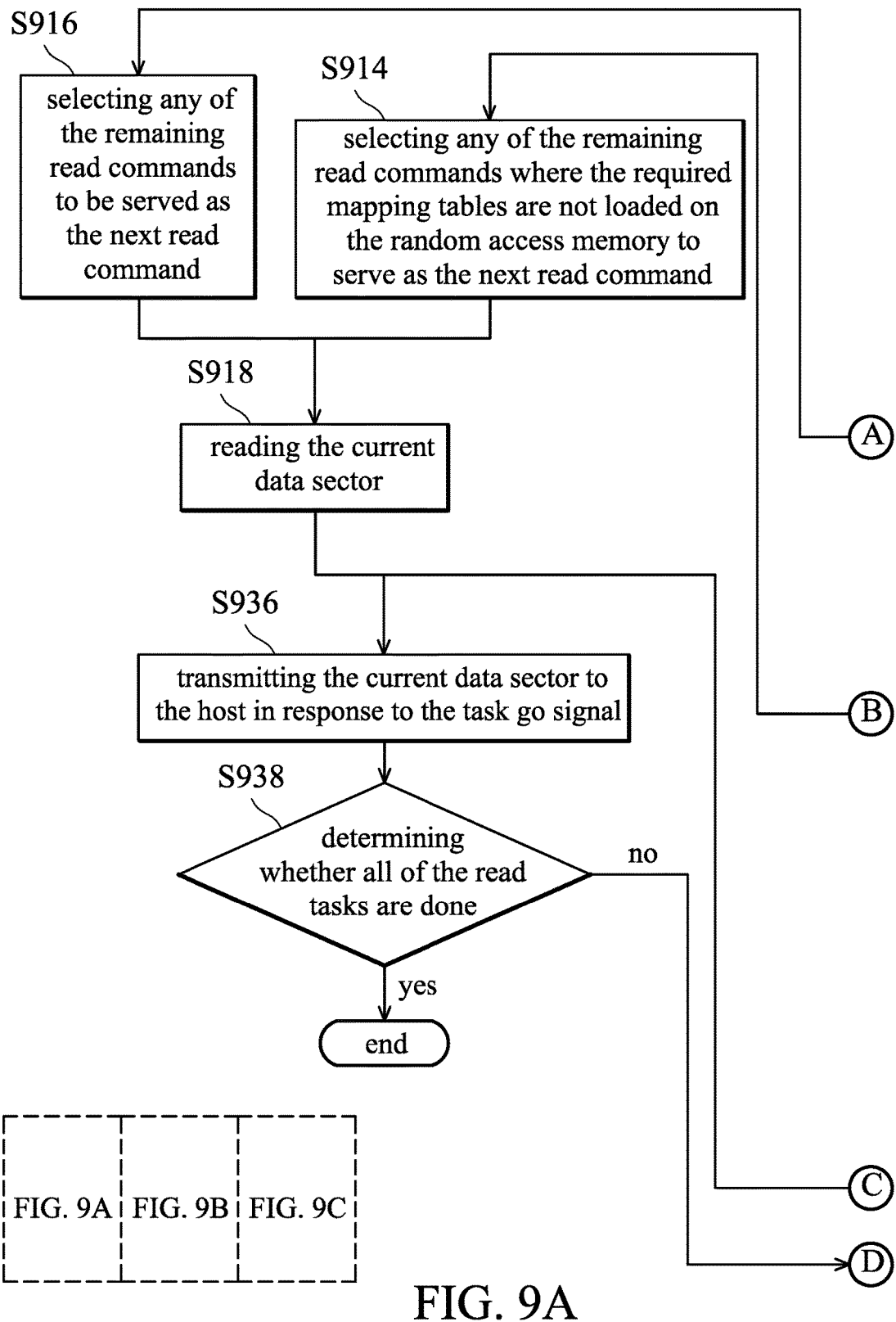
FIGS. 9A-9C are a flowchart of a data reading method in accordance with an embodiment.
Figure 9B:
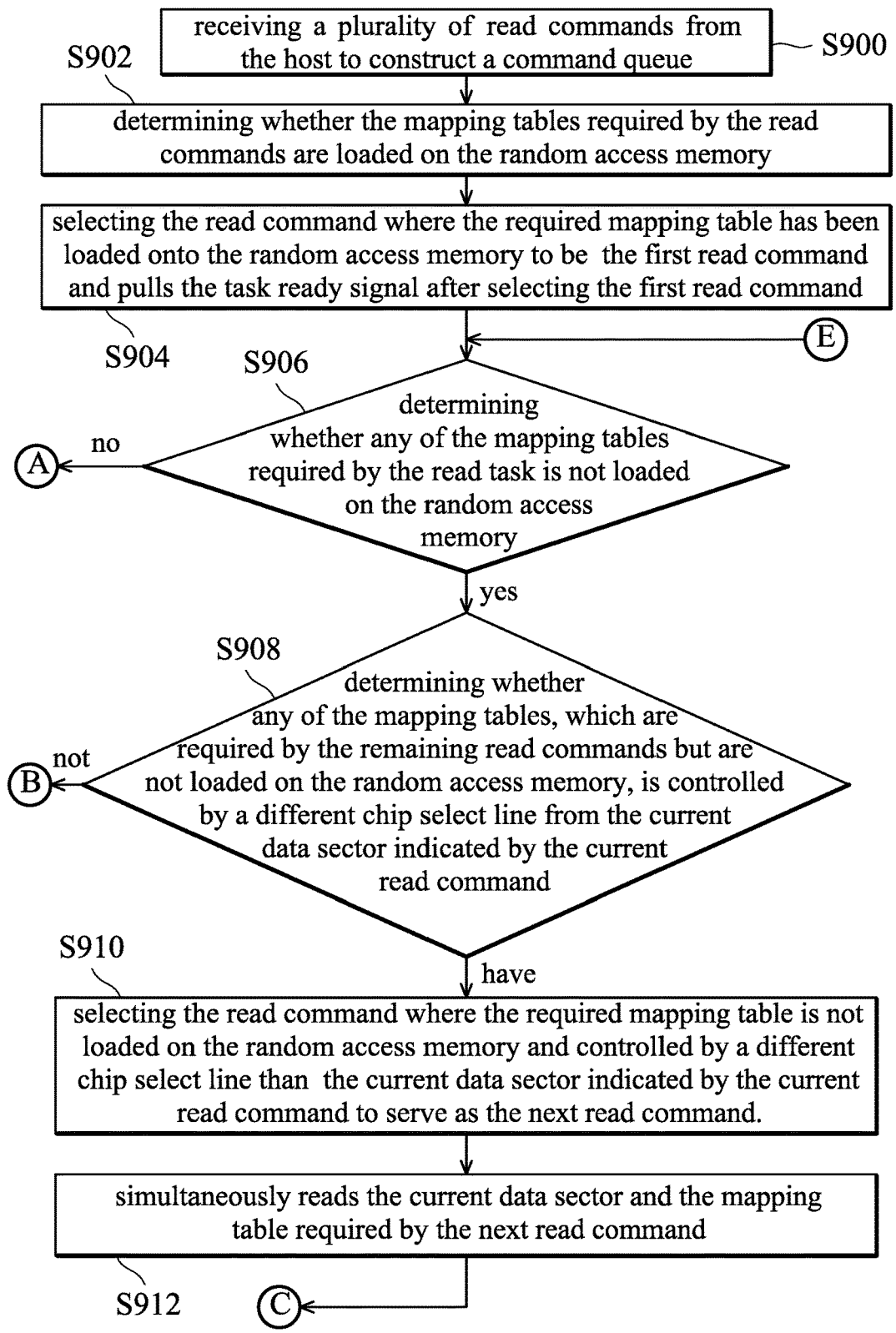
Figure 9C:
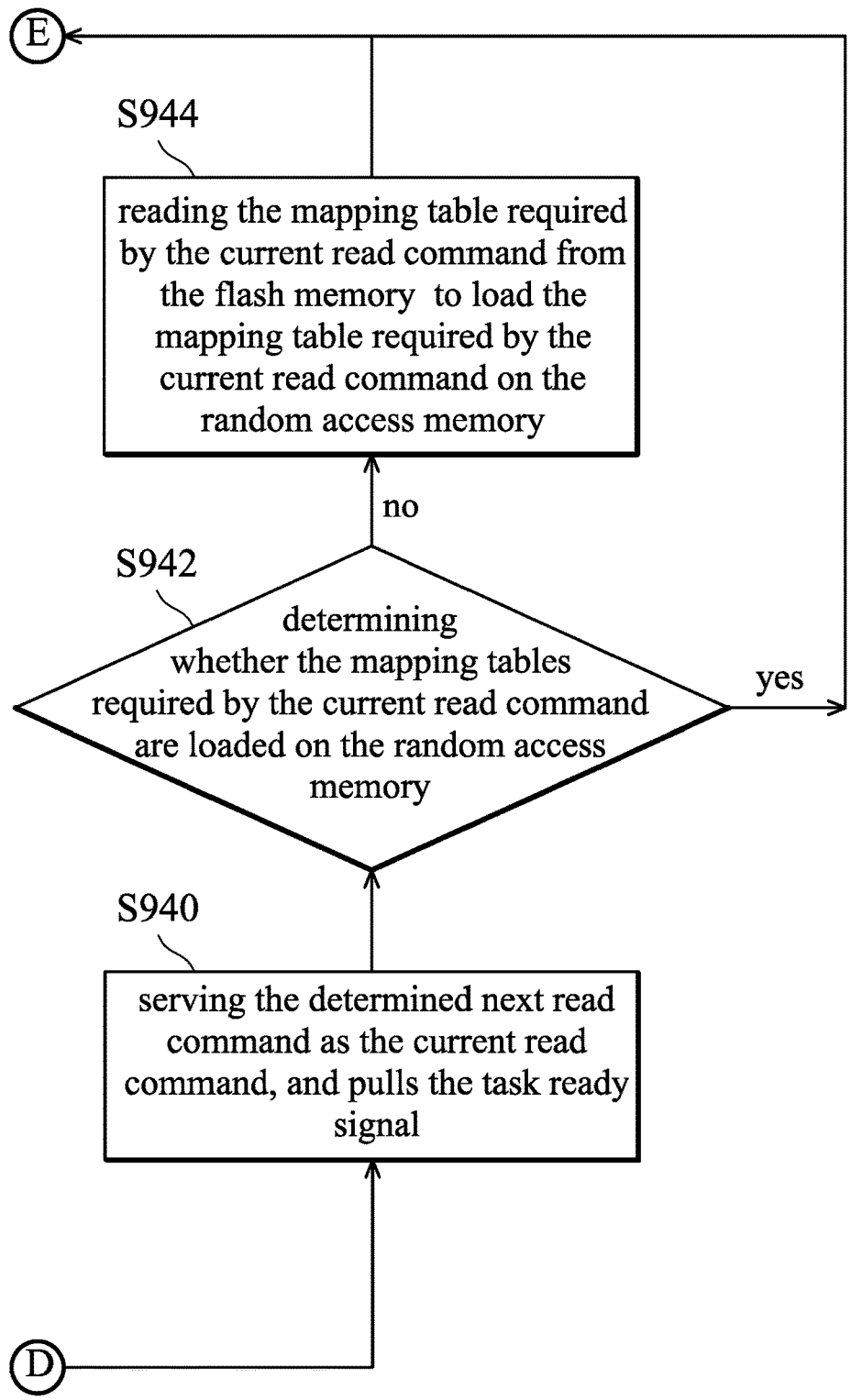
Figure 10A:
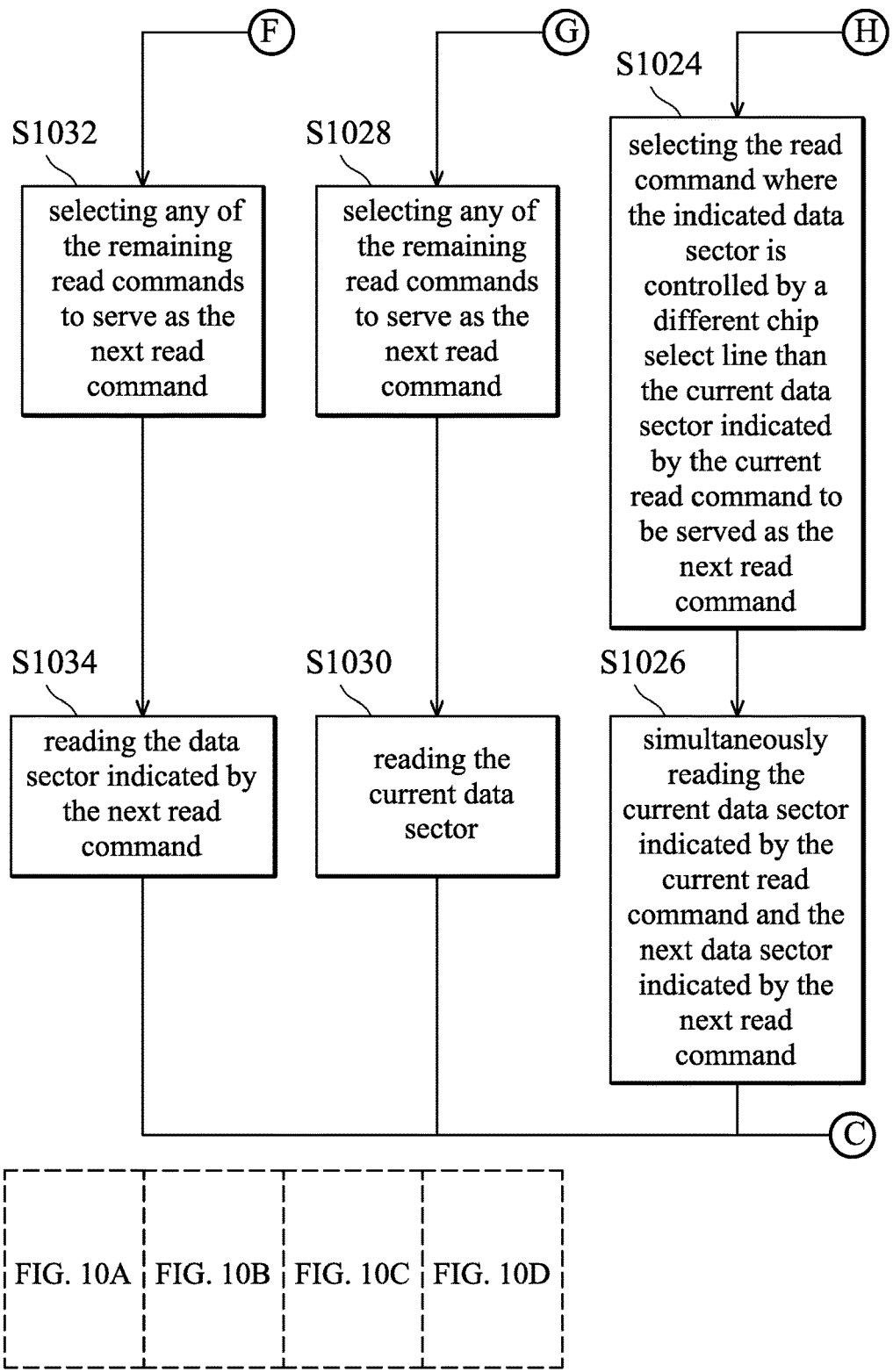
FIGS. 10A-10D are a flowchart of a data reading method in accordance with another embodiment.
Figure 10B:
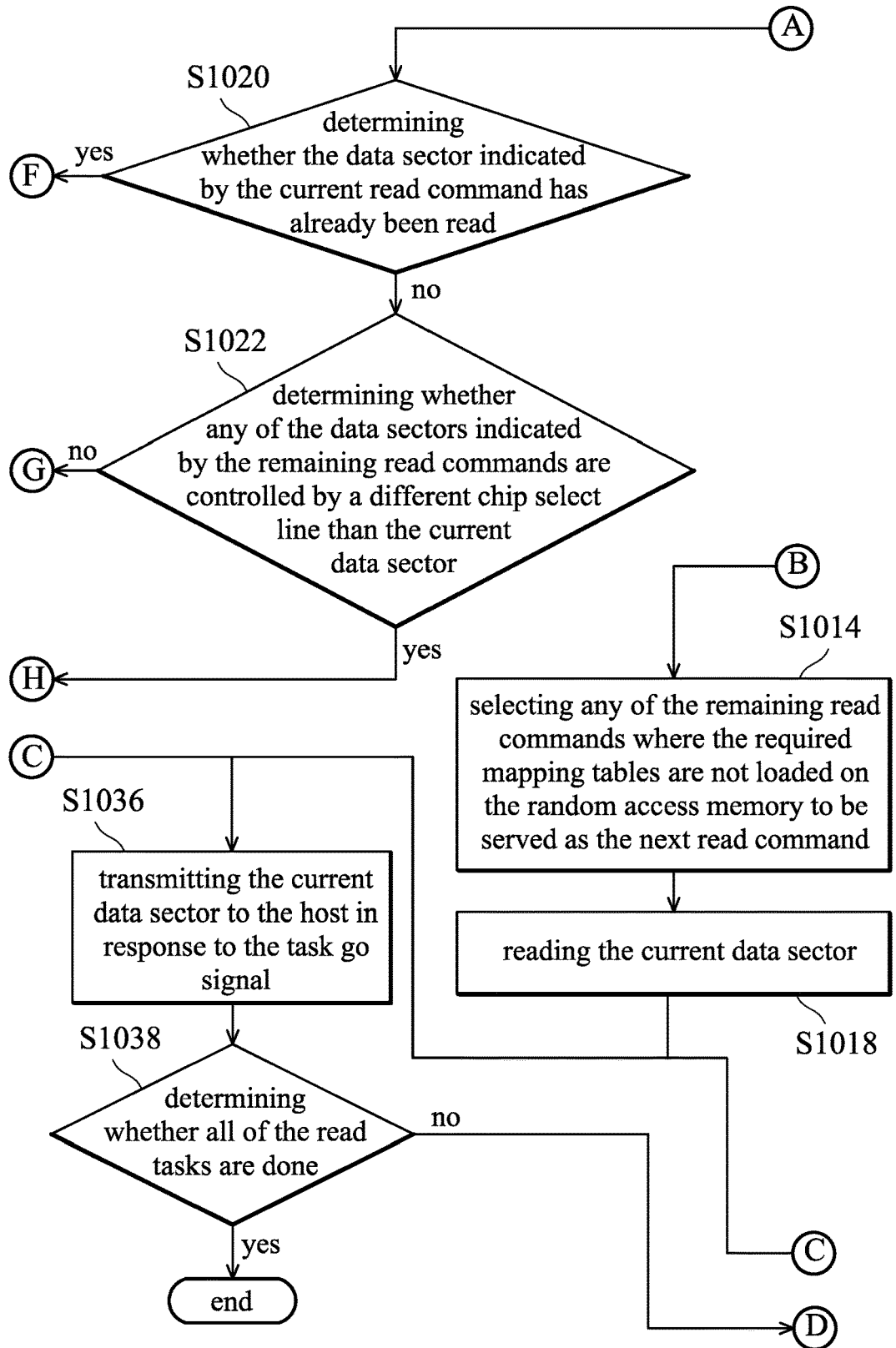
Figure 10C:
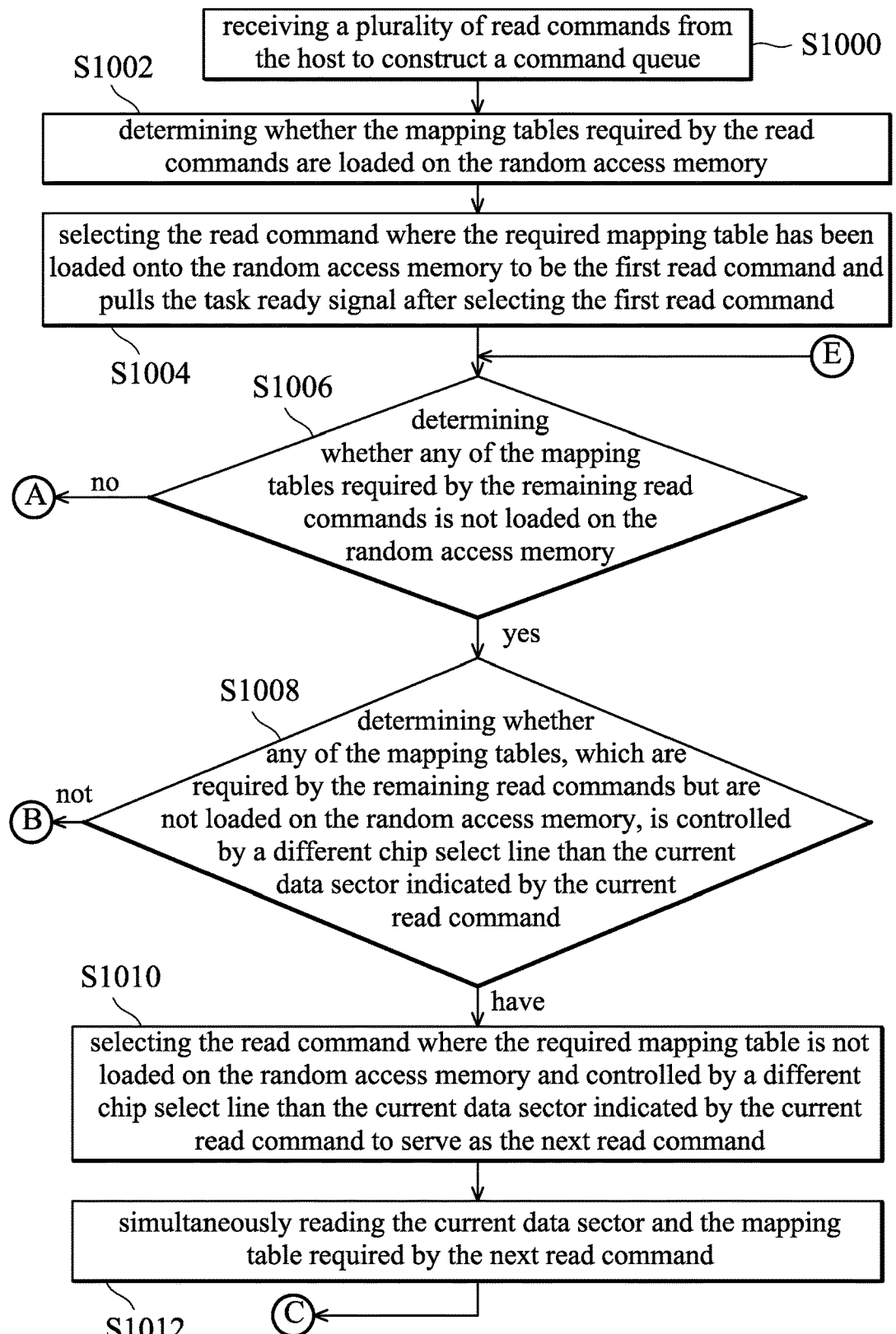
Figure 10D:
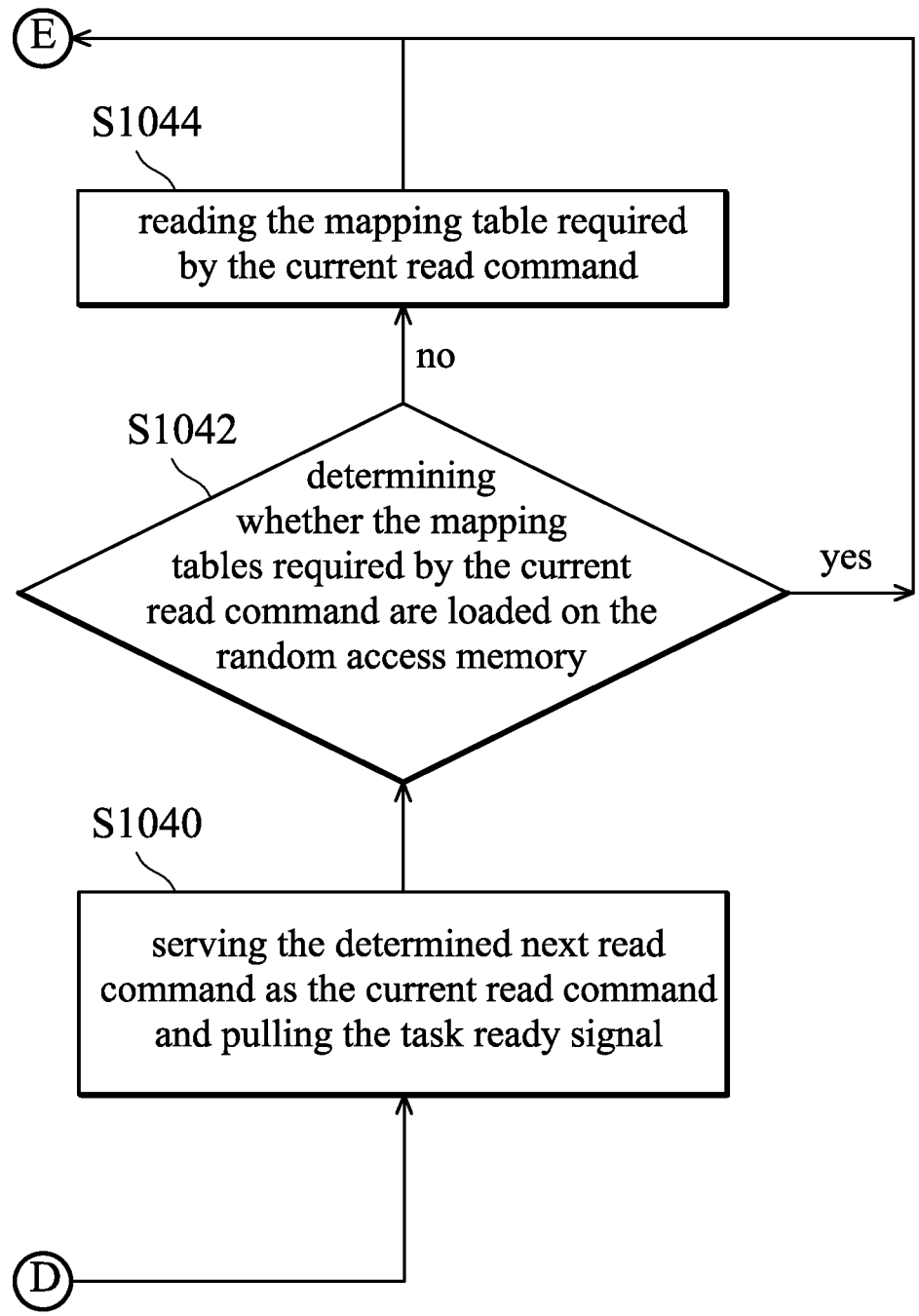

FIGS. 9A-9C are a flowchart of a data reading method in accordance with an embodiment. The data reading method is applied to the data storage device 140 of FIG. 1. In this embodiment, except for the first read command, the controller 160 selects the read comment where the required mapping table is not loaded on the random access memory 166 to serve as the next read command prior to the other read command, wherein the controller 160 is further arranged to select the read command where the required mapping table is controlled by a different chip select line than the current data sector indicated by the current read command to be the next read command (the next read task) from the read commands where the required mapping tables are not loaded on the random access memory 166. When the read commands where the required mapping tables are not loaded on the random access memory 166 are all done, the controller 160 is further arranged to select the read command where the required mapping table has been loaded onto the random access memory 166 to serve as the next read command (the next read task). Moreover, the controller 160 is further arranged to dynamically adjust memory space arranged to cache the data of the read commands in the random access memory 166 according to the number of read commands. More specifically, when the number of read commands is "N", the controller 160 is configured to adjust the memory space arranged to cache the data of the read commands in the random access memory 166 in order to cause each of the mapping tables required by the read commands to have 1/N chances of being loaded on the random access memory 166. Therefore, at least one of the mapping tables required by the read commands in the command queue will already be loaded on the random access memory 166. The process starts at step S900.

In step S900, the controller 160 receives a plurality of read commands from the host 120 to construct a command queue, wherein the data sector indicated by one of the read commands requires one of the mapping tables to locate the data, each of the read commands is arranged to prepare (ready) a read task, and the read task is arranged to transmit the indicated data sector to the host 120.

Next, in step S902, the controller 160 determines whether the mapping tables required by the read commands are loaded on the random access memory 166. More specifically, the controller 160 determines whether the mapping tables indicated by the read commands are loaded on the random access memory 166 one by one and tags the status of each of the read commands, but it is not limited thereto.

In other embodiments, the controller 160 can separately store the read commands where the required mapping tables are not loaded and the read commands where the required mapping tables are loaded on the read commands in a different area to know the status of the read commands afterwards.

Next, in step S904, the controller 160 selects the read command where the required mapping table has been loaded onto the random access memory 166 to be the first read command and pulls the task ready signal after selecting the first read command, wherein the first read task prepared (readied) by the first read command is the first of the read tasks to be executed. It should be noted that the first read command is referred to as the current read command, and the first read task prepared by the first read command is referred to as the current read task, until the controller uses another read command as the current read command. Moreover, the task ready signal is arranged to inform the host 120 which read task is ready to be transmitted.

Next, in step S906, the controller 160 determines whether any of the mapping tables required by the read task is not loaded on the random access memory 166. When at least one of the mapping tables required by the read task is not loaded on the random access memory 166, the process goes to step S908. When all of the mapping tables required by the remaining read tasks are loaded on the random access memory 166, the process goes to step S916.

In step S908, the controller 160 determines whether any of the mapping tables, which are required by the remaining read commands but are not loaded on the random access memory 166, are controlled by a different chip select line than the current data sector indicated by the current read command. When at least one of the mapping tables, which are required by the remaining read commands but are not loaded on the random access memory 166, is controlled by a different chip select line than the current data sector indicated by the current read command, the process goes to step S910, otherwise the process goes to step S914.

In step S910, the controller 160 selects the read command where the required mapping table is not loaded on the random access memory 166 and controlled by a different chip select line than the current data sector indicated by the current read command to serve as the next read command.

Next, in step S912, the controller 160 simultaneously reads the current data sector and the mapping table required by the next read command from the flash memory 180 to cache the current data sector indicated by the current read command and loaded the mapping table required by the next read command on the random access memory 166.

In step S914, the controller 160 selects any of the remaining read commands where the required mapping tables are not loaded on the random access memory 166 to serve as the next read command.

In step S916, the controller 160 selects any of the remaining read commands to serve as the next read command.

In step S918, the controller 160 only reads the current data sector from the flash memory 180 to cache the current data sector indicated by the current read command.

Next, in step S936, after receiving a task go signal from the host 120, the controller 160 transmits the current data sector to the host 120 in response to the task go signal.

Next, in step S938, the controller 160 determines whether all of the read tasks are done. When any of the read tasks is not finished, the process goes to step S940, otherwise the process ends at step S938.

In step S940, the controller 160 uses the determined next read command as the current read command, and pulls the task ready signal. Namely, the controller 160 uses the read task prepared by the next read command as the current read task.

Next, in step S942, the controller 160 determines whether the mapping tables required by the current read command are loaded on the random access memory 166. When the mapping tables required by the current read command are loaded on the random access memory 166, the process returns to the step S906, otherwise the process goes to step S944.

In step S944, the controller 160 reads the mapping table required by the current read command from the flash memory 180 to load the mapping table required by the current read command on the random access memory 166.

FIGS. 10A-10D are a flowchart of a data reading method in accordance with another embodiment. The data reading method is applied to the data storage device 140 of FIG. 1, and the data reading method is similar to the data reading method of FIG. 9. In this embodiment, the mapping tables required by the read commands are loaded on the random access memory 166, the controller 160 is configured to select the read command where the indicated data sector is controlled by a different chip select line than the current data sector to serve as the next read command, and reads the data sector indicated by the next read command in the current work period. The steps S1000~S1004, S1008~S1014, S1018 and S1036~S1044 are similar to steps S900~S904, S908~S912 and S936~S944 of FIG. 9, so please refer to FIG. 9 for details.

In step S1006, the controller 160 determines whether any of the mapping tables required by the remaining read commands is not loaded on the random access memory 166. When at least one of the mapping tables required by the remaining read commands is not loaded on the random access memory 166, the process goes to step S1008. When all of the mapping tables required by the remaining read commands are loaded on the random access memory 166, the process goes to step S1020.

In step S1020, the controller 160 determines whether the data sector indicated by the current read command has already been read from the flash memory 160. When the current data sector has already been read from the flash memory 160, the process goes to step S1032, otherwise the process goes to step S1022.

In step S1022, the controller 160 determines whether any of the data sectors indicated by the remaining read commands are controlled by a different chip select line than the current data sector. When at least one of the data sectors indicated by the remaining read commands is controlled by a different chip select line than the current data sector, the process goes to step S1024, otherwise the process goes to step S1028.

In step S1024, the controller 160 selects the read command where the indicated data sector is controlled by a different chip select line than the current data sector indicated by the current read command to serve as the next read command.

Next, in step S1026, the controller 160 reads the current data sector indicated by the current read command and the next data sector indicated by the next read command from the flash memory 180 at the same time.

In step S1028, the controller 160 selects any of the remaining read commands to serve as the next read command.

Next, in step S1030, the controller 160 only reads the current data sector from the flash memory 180.

In step S1032, the controller 160 selects any of the remaining read commands to serve as the next read command.

Next, in step S1034, the controller 160 only reads the data sector indicated by the next read command from the flash memory 180.

The data storage device and the data reading methods may arrange the sequence of the read commands according to the specific rule to reduce the idle time of the controller.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a flash memory;
   a random access memory; and
   a controller, receiving a plurality of read commands from a host to constitute a command queue, wherein a data sector indicated by one of the read commands requires one of a plurality of mapping tables to be located, and the read commands correspond to a plurality of read tasks, and each of the read commands is arranged to prepare one of the read tasks that is arranged to transmit the data sector indicated by a corresponding one of the read commands to the host,
   wherein the controller selects a first read command from the read commands where one of the mapping tables required by the first read command has already been loaded on the random access memory responsive to the read commands, and a first read task prepared by the first read command is the first of the read tasks to be executed,
   wherein remaining read commands other than the first read command in the read commands in the command queue are prioritized based on whether one of the mapping tables required by one of the remaining read commands is loaded on the random access memory, and one of the remaining read commands that requires one of the mapping tables having not been loaded on the random access memory has a higher priority than another one of the remaining read commands that requires one of the mapping tables having already been loaded on the random access memory, wherein before the first read task is executed, the controller selects a second read command from remaining read commands other than the first read command in the read commands and arranges a second read task prepared by the second read command to be executed after the first read task, wherein before the first read task is executed, the controller further reads a first data sector indicated by the first read command and the mapping table required by the second read task at the same time from the flash memory.

2. The data storage device as claimed in claim 1, wherein the flash memory includes a plurality of chips and a plurality of chip select lines, and each of the chip select lines controls at least one of the chips, wherein the controller selects the second read command where the required mapping table is not loaded on the random access memory nor controlled by the chip select line which is different from the first data sector.

3. The data storage device as claimed in claim 2, wherein when all of the mapping tables required by the remaining read commands which are not loaded on the random access memory but are controlled by the same chip select line as the first data sector, the controller selects any of the remaining read commands where the required mapping table is not loaded on the random access memory to serve as the second read command, wherein the controller only reads the first data sector from the flash memory before the first read task is executed, and the controller reads the mapping table required by the second read command from the flash memory after a first task go signal arranged to execute the first read task is received from the host and before a second task go signal arranged to execute the second read task is received from the host.

4. The data storage device as claimed in claim 3, wherein when all of the mapping tables required by the remaining read commands are loaded on the random access memory, the controller selects any of the remaining read commands to serve as the second read command, and only reads the first data sector from the flash memory before the first read task is executed.

5. The data storage device as claimed in claim 3, wherein when all of the mapping tables required by the remaining read command are loaded on the random access memory, the controller selects the read command indicating the data sector that is not controlled by the same chip select line as the first data sector to serve as the second read command, and reads the first data sector and the second data sector from the flash memory at the same time before the first read task is executed.

6. The data storage device as claimed in claim 5, wherein when all of the mapping tables required by the remaining read command are loaded on the random access memory and all of the data sectors indicated by the remaining read command are controlled by the same chip select line as the first data sector, the controller selects any of the remaining read commands to serve as the second read command, and only reads the first data sector from the flash memory before the first read task is executed.

7. The data storage device as claimed in claim 5, wherein when all of the mapping tables required by the remaining read commands are loaded on the random access memory and the data sector required by a current read command is read, the controller selects any of the remaining read commands to serve as a next read command, and only reads the data sector indicated by the next read command from the flash memory before the read task prepared by the current read command is executed.

8. The data storage device as claimed in claim 1, wherein the data storage device meets the Embedded Multi Media Card (eMMC) version 5.1 specification, wherein the controller determines an order of execution of the read tasks after the read commands are continuously received from the host.

9. The data storage device as claimed in claim 1, wherein the controller further dynamically adjusts memory space arranged to cache data of the read commands in the random access memory according to a number of read commands.

10. The data storage device as claimed in claim 9, wherein when the number of read commands is N, the controller further adjusts the memory space arranged to cache data of the read commands in the random access memory in order to cause each of the mapping tables required by the read commands to have 1/N chances of being loaded on the random access memory.

11. A data storage device, comprising:
a flash memory;
a random access memory; and
a controller, receiving a plurality of read commands from a host to constitute a command queue, and determining an order for execution of the read commands, wherein a data sector indicated by one of the read commands requires one of a plurality of mapping tables to be located, and the read commands correspond to a plurality of read tasks, and each of the read commands is arranged to prepare one of the read tasks that is arranged to transmit the indicated data sector to the host, wherein the controller selects a first read command where the mapping table required by the first read command has already been loaded on the random access memory from the read commands to be the first of the read tasks executed, wherein remaining read commands other than the first read command in the read commands in the command queue are prioritized based on whether one of the mapping tables required by one of the remaining read commands is loaded on the random access memory, and one of the remaining read commands that requires one of the mapping tables having not been loaded on the random access memory has a higher priority than another one of the remaining read commands that requires one of the mapping tables having already been loaded on the random access memory.

12. The data storage device as claimed in claim 11, wherein the flash memory comprises a plurality of chips and a plurality of chip select lines, and each of the chip select lines is arranged to control at least one of the chips, wherein in the remaining read commands where the required mapping tables are not loaded on the random access memory, the read command where the required mapping table is controlled by the chip select line that is different from the data sector indicated by a current read command has a higher priority than the read command where the required mapping table is controlled by the same chip select line as the data sector indicated by the current read command.

13. The data storage device as claimed in claim 11, wherein when the mapping table required by the next read command is controlled by a different chip select line than the data sector indicated by a current read command, the controller simultaneously reads the data sector indicated by the current read command and the mapping table required by a next read command from the flash memory.

14. The data storage device as claimed in claim 11, wherein in the remaining read commands where the required mapping tables have been loaded on the random access memory, the read command where the indicated data sector is controlled by a different chip select line than the data sector indicated by a current read command has a higher priority than the read command where the indicated data sector is controlled by the same chip select line as the data sector indicated by the current read command.

15. The data storage device as claimed in claim 14, wherein when the data sector indicated by a next read command is controlled by a different chip select line than the data sector indicated by the current read command, the controller simultaneously reads the data sector indicated by the current read command and the data sector indicated by the next read command from the flash memory.

16. A data reading method, applied to a data storage device having a flash memory, comprising:
receiving a plurality of read commands from a host to constitute a command queue, wherein a data sector indicated by one of the read commands requires one of a plurality of mapping tables to be located, and the read commands correspond to a plurality of read tasks, and each of the read commands is arranged to prepare one of the read tasks that is arranged to transmit the data sector indicated by a corresponding one of the read commands to the host;
determining whether the mapping tables required by the read commands are loaded on a random access memory;
selecting a first read command from the read commands where one of the mapping tables required by the first read command has already been loaded on the random access memory responsive to the read commands, wherein a first read task prepared by the first read command is the first of the read tasks to be executed, wherein remaining read commands other than the first read command in the read commands in the command queue are prioritized based on whether one of the mapping tables required by one of the remaining read commands is loaded on the random access memory, and one of the remaining read commands that requires one of the mapping tables having not been loaded on the random access memory has a higher priority than another one of the remaining read commands that requires one of the mapping tables having already been loaded on the random access memory;
before the first read task is executed, selecting a second read command from remaining read commands other than the first read command in the read commands and arranging a second read task prepared by the second read command to be executed after the first read task; and
before the first read task is executed, reading a first data sector indicated by the first read command and the mapping table required by the second read task at the same time from the flash memory.

17. The data reading method as claimed in claim 16, wherein the flash memory includes a plurality of chips and a plurality of chip select lines, and each of the chip select lines controls at least one of the chips, wherein the step of selecting the second read command from the remaining read commands further comprises:
determining whether the mapping tables, which are required by the remaining read commands and are not loaded on the random access memory, are controlled by a different chip select line than the first data sector; and
when at least one of the mapping tables, which are required by the remaining read commands and are not loaded on the random access memory, are controlled by a different chip select line than the first data sector, selecting the second read command where the required mapping table is not loaded on the random access memory nor controlled by the chip select line which is different from the first data sector, wherein the data reading method further comprises:
before the first read task is executed, reading the first sector indicated by the first read command and the mapping table required by the second read command for the second read task at the same time from the mapping table.

18. The data reading method as claimed in claim 17, wherein the step of selecting the second read command from the remaining read commands further comprises:
when the mapping tables required by the remaining read commands which are not loaded on the random access memory but are controlled by the same chip select line as the first data sector, selecting any of the remaining read commands where the required mapping table is not loaded on the random access memory to serve as the second read command, wherein the data reading method further comprises:
before the first read task is executed, only reading the first data sector from the flash memory; and
after a first task go signal arranged to execute the first read task is received from the host and before a second task go signal arranged to execute the second read task is received from the host, reading the mapping table required by the second read command from the flash memory.

19. The data reading method as claimed in claim 18, wherein the step of selecting the second read command from the remaining read commands further comprises:
when all of the mapping tables required by the remaining read commands are loaded on the random access memory, selecting any of the remaining read commands to serve as the second read command, wherein the data reading method further comprises:
before the first read task is executed, only reading the first data sector from the flash memory.

20. The data reading method as claimed in claim 18, wherein the step of selecting the second read command from the remaining read commands further comprises:
when all of the mapping tables required by the remaining read command are loaded on the random access memory, determining whether the data sectors indicated by the remaining read commands are controlled by a different chip select line than the first data sector; and
when at least one of the data sectors indicated by the remaining read commands is controlled by the same chip select line as the first data sector, selecting the read command indicating the data sector that is not controlled by the same chip select line as the first data sector to serve as the second read command, wherein the data reading method further comprises:
before the first read task is executed, reading the first data sector and the second data sector from the flash memory.

21. The data reading method as claimed in claim 20, wherein the step of selecting the second read command from the remaining read commands further comprises:

when all of the data sectors indicated by the remaining read commands are controlled by the same chip select line as the first data sector, selecting any of the remaining read commands to serve as the second read command, wherein the data reading method further comprises:

before the first read task is executed, only reading the first data sector from the flash memory.

22. The data reading method as claimed in claim 20, further comprising:

when all of the mapping tables required by the remaining read commands are loaded on the random access memory and the data sector required by a current read command is read, selecting any of the remaining read commands to serve as a next read command; and before the read task prepared by the current read command is executed, only reading the data sector indicated by the next read command from the flash memory.

23. The data reading method as claimed in claim 16, wherein the data storage device meets the Embedded Multi Media Card (eMMC) version 5.1 specification, wherein an order of execution of the read tasks is determined after the read commands are continuously received from the host.

24. The data reading method as claimed in claim 16, further comprising dynamically adjusting memory space arranged to cache data of the read commands in the random access memory according to a number of read commands.

25. The data reading method as claimed in claim 24, wherein when the number of read commands is N, the memory space arranged to cache data of the read commands in the random access memory is adjusted in order to cause each of the mapping tables required by the read commands to have 1/N chances of being loaded on the random access memory.

* * * * *